United States Patent [19]
Schroder

[11] 3,779,232
[45] Dec. 18, 1973

[54] HEAT ACCUMULATOR
[75] Inventor: Johann Schroder, Achen, Germany
[73] Assignee: U.S. Philips Corporation, New York, N.Y.
[22] Filed: Aug. 25, 1971
[21] Appl. No.: 174,761

[30] Foreign Application Priority Data
Aug. 29, 1970 Netherlands.................. 7012830

[52] U.S. Cl. ............................................. 126/400
[51] Int. Cl. ............................................. F24h 7/00
[58] Field of Search..................... 126/400; 252/70, 252/71; 62/439

[56] References Cited
UNITED STATES PATENTS
3,605,720  9/1971  Mayo............................. 126/400 X
3,080,706  3/1963  Flynn, Jr. et al...................... 60/24

Primary Examiner—William F. O'Dea
Assistant Examiner—Harold Joyce
Attorney—Frank R. Trifari

[57] ABSTRACT

A heat accumulator comprising a eutectic mixture of NaF and magnesium fluoride having a melting point of less than 850°. The mixture may additionally comprise potassium fluoride and/or calcium fluoride. The heat accumulator is suitable for supplying thermal energy to a hot-gas engine and for use in heat accumulating ovens.

10 Claims, 1 Drawing Figure

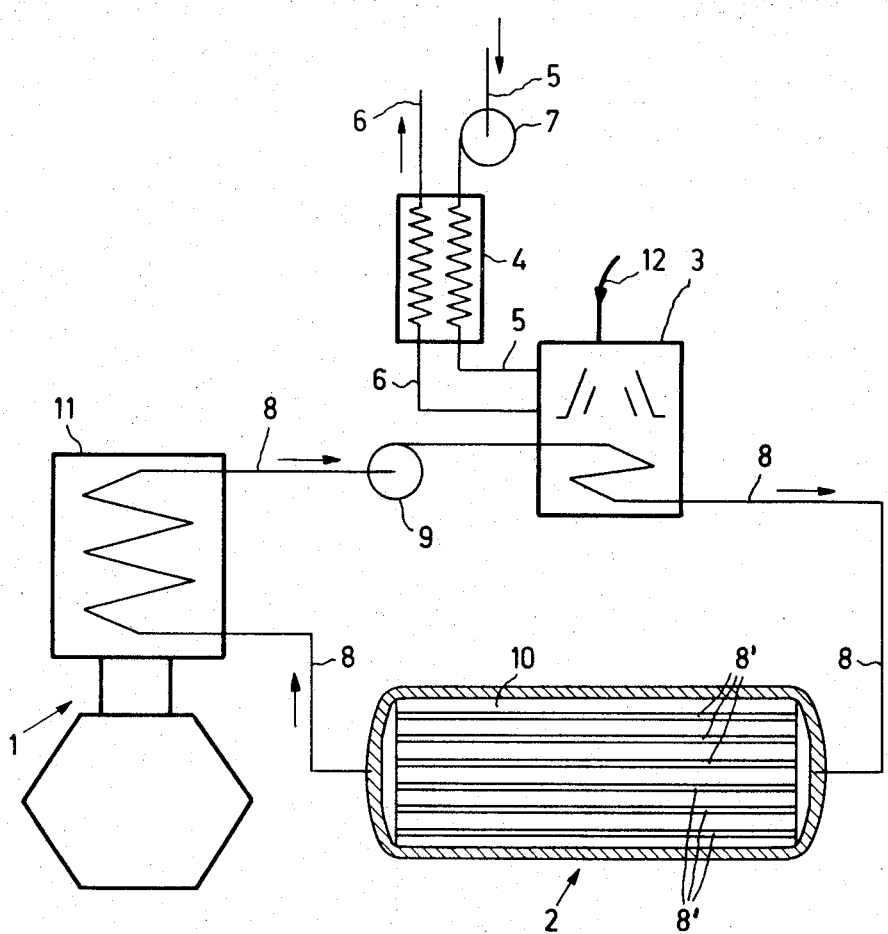

HEAT ACCUMULATOR

The invention relates to a heat accumulator comprising a reservoir which contains an inorganic material suitable for accumulating heat and means for supplying and conducting away heat. The invention particularly relates to heat accumulators having a high heat accumulating output per unit volume and weight for use as an accumulating oven or room heating or in combination with heat energy machines such as hot-gas engines.

Combinations of hot-gas engines and heat accumulators in which the heat accumulator is in heat exchanging contact with the heater of the hot-gas engine either directly or by means of heat transporting system are used, for example in those cases where a primary heat source is not continuously available or cannot be used. In this case the use of solar energy may be considered which is only available for a part of the 24-hour period. If the primary heat source requires the supply of air and the removal of combustion gases, similar situations may occur. Consider in this case, underwater uses and vehicles which are used in areas where the removal of combustion gases in the atmosphere is prohibited or is subject to stringent restrictions.

The use of a heat accumulator for the supply of heat to, for example, a hot-gas engine is known per se. It has been proposed to use a heat accumulator for this purpose, which in its simplest form consists of a reservoir filled with lithium hydride having melting point 680° C, lithium hydroxide having melting point 450° C, or lithium fluoride having melting point 848° C (see U.S. Pat. No. 3,080,706).

As compared with the other compounds mentioned in the patent specification lithium fluoride has the highest heat content per unit volume and it is stable at temperatures up to 900° C and is chemically less inactive when it is anhydrous and when it does not contain oxygen in the form of oxides or other compounds.

In accumulating ovens sintered magnesite (MgO) is generally used as a heat accumulating material. The thermal capacity of this material per unit volume and weight is relatively low. As a result, such ovens generally have a larger volume than other known heating devices. Accumulating ovens which contain cast iron as a heat accumulating material are also sometimes used in central heating installations. It is true that the thermal capacity per unit volume of this material is slightly larger than that of magnesite, but the thermal capacity per unit weight is clearly less than that of magnesite. This means that due to the large floor load, such ovens can only be accommodated economically in cellars of large buildings.

The high price, the limited availability and the relatively high melting temperature inhibit using lithium fluoride on a large scale as a material for storing thermal energy. In addition there are only few, very expensive materials which are corrosion resistant for a long period at temperatures of more than 800° C.

The object of the present invention is to provide a solution to these problems.

A solution was achieved by a heat accumulator comprising a reservoir which contains an inorganic material having a melting point of less than 850° C and means for supplying and conducting away heat. The inorganic material mainly consists of a eutectic mixture of sodium fluoride and one or more fluorides chosen from the group constituted by potassium fluoride, calcium fluoride and magnesium fluoride, on the understanding that the eutectic mixture contains potassium fluoride and/or calcium fluoride only when in addition to sodium fluoride also magnesium fluoride is present and that the quantity of potassium fluoride is less than 30 mol. per cent and the quantity of calcium fluoride is less than 40 mol. per cent.

Eutectic mixtures having larger quantities of potassium fluoride or calcium fluoride are found to have a thermal content too low so as to be technically usable. In the eutectic mixtures which are used according to the invention, potassium and calcium fluoride serve in the first place to establish a relatively low eutectic melting point. Suitable eutectic mixtures including potassium fluoride and calcium fluoride contain magnesium fluoride in addition to sodium fluoride.

The heat of fusion and the thermal capacity of the fluorides of sodium, potassium, calcium and magnesium are relatively high of themselves, but the high melting temperature stands in the way of using the pure fluorides for storing heat in the form of latent melting heat.

It was surprisingly found during experiments that the thermal expansion during melting of eutectic mixtures which are used according to the invention is smaller than was to be expected on the ground of calculations based on the thermal expansion during melting of the pure components. The volume of the reservoir must of course correspond to the volume of the heat accumulating material at the highest temperature which is to be allowed during use. The volume of the reservoir may thus be smaller than would be expected when using the eutectic mixtures according to the invention. The melting point of the eutectic mixtures used according to the invention is below 850° C. This means that a larger number of material is available from which the heat accumulator can be built up than is the case when using lithium fluoride.

When using the eutectic mixtures according to the invention a considerable economy is obtained as compared with the use of lithium fluoride, because said fluorides are marketed at much lower prices than lithium fluoride and are available in larger quantities.

It has been found in practice that the eutectic mixtures used according to the invention are even less chemically aggressive than lithium fluoride, provided that they are also anhydrous and free of oxygen compounds. The fluorides may be rendered anhydrous and free from oxygen compounds by treating the fluorides in a molten state with ammonium fluoride or ammonium bifluoride until the melt which was initially opalescent due to the presence of oxygen compounds, has become bright.

In the table below several eutectic mixtures are compared mutually and with lithium fluoride. The Table states the quantity of heat which can be accumulated or supplied by said materials in the temperature range of from 150° C to 10° C above the melting point. The Table also states the values for sintered magnesite and cast iron in the same temperature range.

TABLE

| | Melting point, °C. | ΔT*, degrees | Thermal content over ΔT in— | | Melting heat in— | |
|---|---|---|---|---|---|---|
| | | | Cal./gr. | Cal./ml. | Cal./gr. | Cal./ml. |
| LiF | 848 | 708 | 609 | 1,090 | 223 | 399 |
| MgO | | 708 | 191 | 533 | | |
| Cast iron | | 708 | 92 | 649 | | |
| Melt 1 | 747 | 607 | 329 | 780 | 136 | 322 |
| LiF | | 607 | 316 | 758 | | |
| MgO | | 607 | 164 | 459 | | |
| Cast iron | | 607 | 79 | 559 | | |
| Melt 2 | 832 | 692 | 412 | 902 | 150 | 328 |
| LiF | | 692 | 367 | 870 | | |
| MgO | | 692 | 187 | 522 | | |
| Cast iron | | 692 | 90 | 635 | | |
| Melt 3 | 809 | 669 | 364 | 768 | 130 | 274 |
| LiF | | 669 | 359 | 854 | | |
| MgO | | 669 | 187 | 505 | | |
| Cast iron | | 669 | 87 | 614 | | |

*ΔT is the temperature range from 150° C. to 10° C. above the melting point.

Note:
Melt 1 consists of a eutectic mixture of 65 mol. percent NaF+23 mol. percent $CaF_2$+12 mol. percent $MgF_2$.
Melt 2 consists of a eutectic mixture of 75 mol. percent NaF+25 mol. percent $MgF_2$.
Melt 3 consists of a eutectic mixture of 62.5 mol. percent NaF+22.5 mol. percent $MgF_2$+15.0 mol. percent KF.

The Table shows that due to heat-technical considerations, the eutectic mixtures in the temperature range indicated can replace lithium fluoride and yield considerably better results than sintered magnesite (MgO) and cast iron.

It is evident that the mixtures need not comprise an exact eutectic composition at the instant when the reservoir of the heat accumulator is filled with this mixture. A deviation of a few percent (less than, for example, 2 per cent by weight) generally be tolerated. After several cycles of heating until the mass has melted and afterward cooling, the excess of one of the components which has a higher melting point than the eutectic composition is deposited, and a eutectic mixture is the result. Since this deposition will take place particularly at those areas in the reservoir where heat is taken up, this may result in a poorer transfer of heat. The deviations of the eutectic composition must therefore be preferably as small as is possible in practice. Technical qualities if, for example, 99 per cent purity may, however, be used. The presence of small quantities of impurities may result in a small deviation of the previously mentioned melting points. It is, however, desirable that as already previously noted the fluorides are anhydrous and do not contain oxygen in the form of oxides or other compounds.

The heat accumulator according to the invention may be used in combination with any type of hot-gas engine. A description of a hot-gas engine provided with a cylinder in which a piston and a cooperating displacer define a hot space (expansion space) and a cold space is described in Philips Technical Review 20 pages 245 -262 1958/1959. If the heater consists of a system of ducts through which the working medium flows on its path to and from the expansion space, these may be in direct heat exchanging contact with the eutectic mixtures in the reservoir of the heat accumulator. If desired the heat may alternatively be transferred with a heat transferring medium, for example, a liquid Na-K alloy which is circulated in a system which is at one end in heat exchanging contact with the heat accumulator and at the other end with the heater of the hot-gas engine. Also so-called "heat pipes" may be used for this purpose.

In order that the invention may be readily carried into effect it will now be described in detail by way of example with reference to the accompanying diagrammatic drawing which comprises a sole FIGURE.

DESCRIPTION OF THE PREFERRED EMBODIMENT

The FIGURE shows a hot-gas engine 1, a heat accumulator 2, a burner 3 with fuel supply 12, a preheater 4, a system of pipes 5 and 6 and a pump 7 for the supply of air and removal of combustion gases 6, respectively. The air is passed through the preheater 4 in which the combustion gases give off heat to the air. In addition a system of pipes 8 including a pump 9 is provided. The pipes 8 contain a liquid alloy, for example, a sodium-potassium alloy. Under those circumstances when combustion gases can or may be removed in the atmosphere, heat is supplied in the burner 3 to the liquid alloy which is circulated in the system of pipes 8. Coming from the burner the heated liquid alloy first flows through the heat accumulator 2 through a number of pipes 8'. The accumulator comprises a reservoir 10 filled with one of the said eutectic mixtures, for example, 75 mol per cent NaF + 25 mol per cent $MgF_2$ O. Part of the thermal energy is passed on to the eutectic mixture. Subsequently the alloy flows along the heater 11 of the hot-gas engine and via the pump 9 back to the burner. In the heater 11 part of the heat is passed on to the hot-gas engine. During the periods when combustion gases cannot or may not be conducted away to the atmosphere, the heat stored in the heat accumulator 2 is transferred by means of the liquid alloy circulated through the pipes 8 to the heater 11 of the hot-gas engine 1, i.e., when the accumulator temperature is higher than that of the alloy flowing from burner 3.

It is of course alternatively possible to store electrical heat in the heat accumulator. To this end electrical heating elements are provided in and/or around the heat accumulator. If desired a burner, for example, for emergency cases may also be present in such a system.

1. A heat accumulator comprising a reservoir which contains an inorganic material having a melting point of less than 850° C and consisting of essentially a eutectic mixture of sodium fluoride and at least one fluoride selected from the group consisting of potassium fluoride, calcium fluoride and magnesium fluoride with the provision that if potassium fluoride and/or calcium fluoride is present, then magnesium fluoride must be present, with the quantity of potassium fluoride present being less than 30 mol per cent the quantity of calcium fluoride present being less than 40 mol per cent and heat transfer means for supplying to the mixture thermal energy and for discharging from the mixture thermal energy.

2. A heat accumulator according to claim 1 wherein the inorganic material consists of a eutectic mixture of sodium fluoride and magnesium fluoride.

3. A heat accumulator according to claim 1 wherein the inorganic material consists of a eutectic mixture of sodium fluoride, magnesium fluoride and calcium fluoride.

4. A heat accumulator according to claim 1 wherein the inorganic material consists of a eutectic mixture of sodium fluoride, magnesium fluoride and potassium fluoride.

5. In combination with a heat accumulator as defined in claim 1 which receives and stores thermal energy from a medium of a higher temperature and discharges thermal energy to a medium of a lower temperature than the temperature of the accumulator, a thermal energy machine which includes a heater part for receiving thermal energy from heat transfer fluid medium, first means for heating said fluid medium, and duct means for transporting said medium to said first heating means for heating the medium, then to said accumulator where thermal energy is transferred between said fluid medium and accumulator in the direction of lower temperature, and to the heater of the machine which receives thermal energy, and back to the first heating means.

6. Apparatus according to claim 5 wherein said machine is a hot-gas engine.

7. Apparatus according to claim 6 wherein said heat transfer fluid medium is a liquid alloy.

8. Apparatus according to claim 7 wherein said fluid is a sodium potassium alloy.

9. Apparatus according to claim 6 wherein said first heating means burns fuel and air and produces combustion gases.

10. A heat accumulator as defined in claim 1 formed as a heat accumulating oven, further comprising means for supplying thermal energy to said accumulator-oven which stores at least a portion of said energy, and means for discharging thermal energy from said oven.

* * * * *

PO-1050
(5/69)

UNITED STATES PATENT OFFICE
CERTIFICATE OF CORRECTION

Patent No. 3,779,232       Dated December 18, 1973

Inventor(s) JOHANN SCHRODER

It is certified that error appears in the above-identified patent and that said Letters Patent are hereby corrected as shown below:

Under "Foreign Application Priority Data" add

--June 23, 1971   Netherland   7108622--

Col. 4, line 35  "FIGURE" should be --Figure-- line 51, change "$MgF_2O$" to --$MgF_2$--

Signed and sealed this 9th day of April 1974.

(SEAL)
Attest:

EDWARD M. FLETCHER, JR.                C. MARSHALL DANN
Attesting Officer                      Commissioner of Patents